United States Patent [19]
Dawson et al.

[11] 3,836,018
[45] Sept. 17, 1974

[54] DISCRETE ARTICLE PALLETIZING AND DEPALLETIZING APPARATUS

[75] Inventors: George J. Dawson, Creve Coeur; Kenneth O. Hannum, St. Peters, both of Mo.; Gerald L. Himmelman, Moorestown, N.J.

[73] Assignee: Alvey, Inc., St. Louis, Mo.

[22] Filed: Nov. 5, 1973

[21] Appl. No.: 412,693

Related U.S. Application Data

[63] Continuation of Ser. No. 207,311, Dec. 13, 1971, abandoned.

[52] U.S. Cl............................. 214/6 FS, 214/6 P
[51] Int. Cl............................................ B65g 57/04
[58] Field of Search.......... 214/6 P, 6 FS, 6 H, 6 D, 214/8.5 D

[56] References Cited
UNITED STATES PATENTS

| | | | |
|---|---|---|---|
| 2,716,497 | 8/1955 | Wahl et al. | 214/6 P |
| 2,841,433 | 7/1958 | Pagdin et al. | 214/6 FS X |
| 2,849,236 | 8/1958 | Beaulieu | 214/6 H |
| 3,013,671 | 12/1961 | Lamb | 214/6 H |
| 3,387,718 | 6/1968 | Roth et al. | 214/6 FS X |
| 3,517,831 | 6/1970 | Hahn | 214/6 P |
| 3,676,978 | 7/1972 | Gottweis et al. | 214/6 P |
| 3,698,755 | 10/1972 | Sinclair et al. | 214/6 FS |

*Primary Examiner*—Robert G. Sheridan
*Attorney, Agent, or Firm*—Gravely, Lieder & Woodruff

[57] ABSTRACT

A method of creating or reducing palletized discrete articles by a suction head which is operable to engage one or more articles forming a layer and transporting the layer of articles onto or off of a pallet or slip sheet, and to a method of handling discrete articles from a plurality of sources of articles of the same or of different characteristics or from a conveyor handling a common product so as to build up palletized stacks thereof with one suction head and a multiple station carriage for pallets or slip sheets working in cooperation with the head. This invention also relates to apparatus for carrying out the method thereof as above defined.

6 Claims, 4 Drawing Figures

DISCRETE ARTICLE PALLETIZING AND DEPALLETIZING APPARATUS

"This is a continuation of our U.S. Pat. application Ser. No. 207,311, filed Dec. 13, 1971, now abandoned".

BRIEF SUMMARY OF THE INVENTION

This invention relates to a method of creating or reducing palletized discrete articles by the use of a suction head working in cooperation with a mulitiple pallet supporting carriage such that articles of many different characteristics may be handled by the subject method through apparatus particularly capable of following the method.

The art heretofore has known palletizing apparatus capable of handling only one type of article, or having capability of handling different characteristics of articles after suitable changes or alterations in the apparatus have been made. The present inprovement is directed to a method, and to the apparatus for practicing the method, wherein a variety of discrete articles of different characteristics may be palletized or depalletized through one means working in cooperation with pallet supporting carriage means movable either in a linear or circular path to bring any one of a plurality of pallets into the reach of the one means which is constituted by a suction head of the character heretofore disclosed in the application of Charles Myles entitled UNIVERSAL SUCTION HEAD, U.S. Pat. Ser. No. 185,078 filed Sept. 30, 1971, now U.S. Pat. No. 3,751,095.

The objects of the present invention are to provide a suction head with a station adjacent a platform or table on which layers of discrete articles may be formed up for engagement by the suction head and transported to a second station where the suction head can be located adjacent a pallet for the release of the layers of discrete articles engaged at the first station, and to provide a suction head means of the foregoing character which is reversable in its operation so as to unload or depalletize articles from pallets; to provide a suction head assembly which can be conveniently coupled to a central collecting, powered conveyor associated with a plurality of individual tributary conveyors for the purpose of palletizing articles supplied from the tributary conveyors or depalletizing articles for distribution into the tributary conveyors, and to improve means for carrying out the aforementioned objects of this invention.

The present invention in a preferred form is capable of performing the method of handling a plurality of different discrete articles ar units selectively from and to layered stacks of each of said different articles by the steps of gripping, at a first station, a layer of discrete articles from its uppermost surface and transporting the articles to a second station for release and to selectively form up or disburse successive layers of the discrete articles at one of the stations. The hereinabove defined method may be practiced by apparatus for selective operation at times to stack and at other times to unstack layers of discrete articles in which there is a discrete article handling means for a layer of such articles, means forming two stations in the apparatus, a discrete article support at one of said stations, carriage means at the second station in which the carriage means has a plurality of discrete article supports, and means capable of moving the carriage in a direction to locate one of the supports in the second station selectively to stack and unstack layers of discrete articles.

BRIEF DESCRIPTION OF THE DRAWINGS

The preferred form of the invention is disclosed in the accompanying drawings wherein.

A DETAILED DESCRIPTION OF THE APPARATUS

Figure 1:
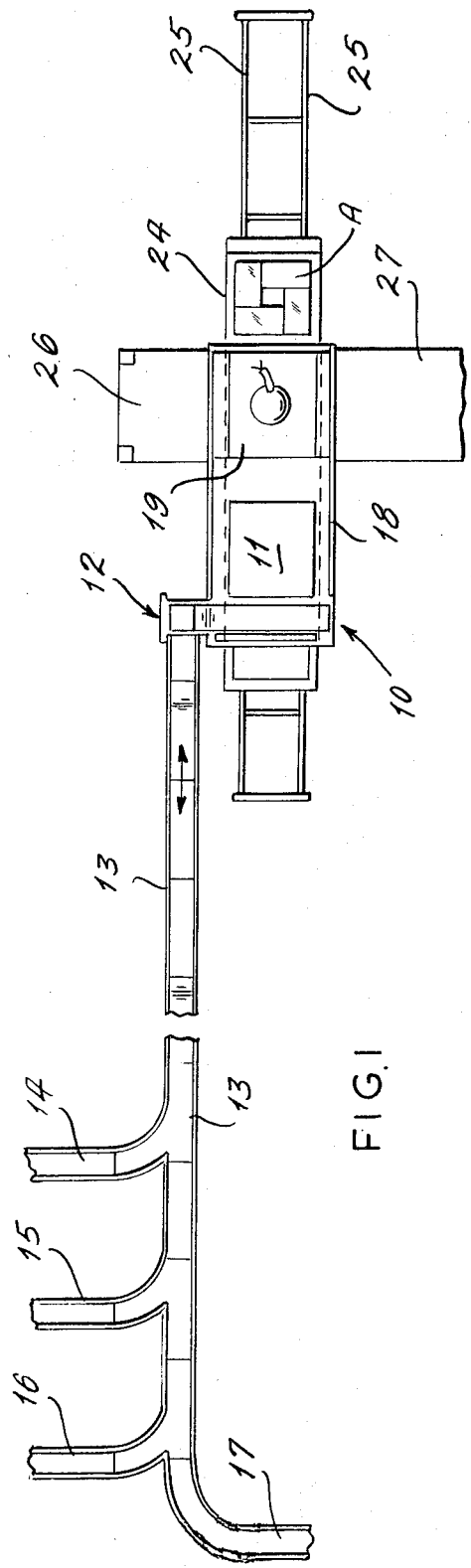
FIG. 1 is a plan view of so much of the apparatus as will be needed to disclose the preferred improvement.
Figure 2:
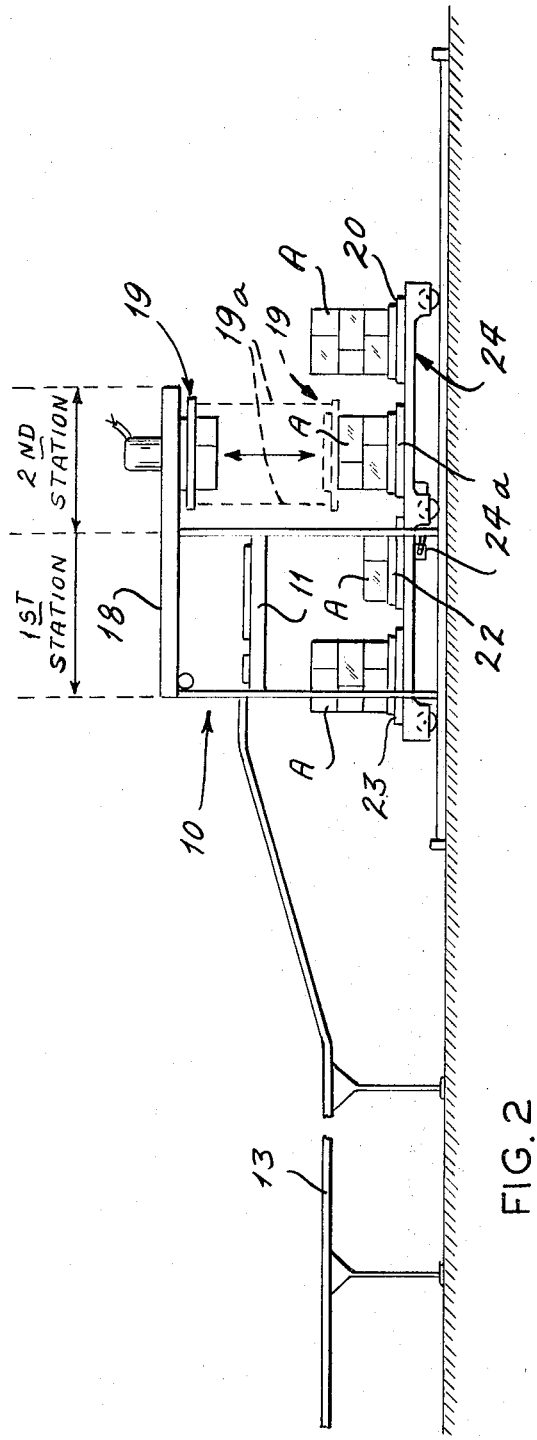
FIG. 2 is a side elevational view of the apparatus shown in FIG. 1.

FIGS. 1 and 2 disclose one form of apparatus for paracticing the subject invention wherein a suitable vertically erect frame structure 10 carries a platform or forming table 11 at a suitable elevation above the floor of a plant or shop. The forming table 11 is suitably connected by an article alignment corner assembly 12, and the corner assembly is, in turn, operatively connected to a power roller conveyor 13 which may have an inclined portion leading from a plurality of powered tributary conveyors 14, 15, 16 and 17. The tributary conveyors 14 through 17 may be arranged so as to be suitable for handling articles having different characteristics or articles having the same characteristics. Therefore, the operation of the powered conveyors 13 through 17, inclusive is intended to effect the collection of articles from any one of the conveyors 14 through 17 and bring such common articles through the corner alignment assembly 12 and onto the forming table 11, whereby a layer of articles of common characteristics can be made on the table 11 or distributed from the table 11 through the corner assembly 12 to the appropriate tributary conveyors 14 through 17 by means of the preincipal conveyor 13. Any suitable conveyor equipment of known character can comprise the several components 12 through 17, inclusive.

The vertical structure of the suction head assembly 10 supports a suitable elevated track 18 for the horizontal traverse of a universal suction head 19. The track 18 defines a first station of the forming table 11 and a second station to one side of the forming table 11 and in a position whereby the suction head 19 can travel in a vertical direction by cables 19a to overlie any one of a plurality of pallets 20, 21, 22 or 23 arranged in a linear configuration on a suitable carriage 24 which, in turn, can be propelled by any suitable means, such as the reversible motor drive 24a, along rails 25 forming a common track which extends in general parallelism with the track 18 for the suction head 19. It is preferred that the carriage 24 should be movable through the lower portion of the vertical structure of the suction head assembly 10 so as to realize as much compactness as is possible. However, it is, of course, recognized that the track rails 25 can be directed through the second station perpendicular to the direction shown in FIG. 1.

When any one of the pallets 20 through 23 disclosed in FIG. 2 has received a complete stack or layer of articles A, it can be removed from the carriage 24 by a fork lift truck (not shown). However, as is indicated in FIG.

1, the carriage 24 is arranged to pass adjacent empty pallet magazine 26 which is aligned at station 2, so that any loaded pallet on the carriage 24 can be removed and a pallet from the magazine 26 placed on the carriage 24. The loaded pallet is removable from the carriage 24 opposite the pallet magazine 26, and for this purpose a roller conveyor 27 can be incorporated so as to accommodate two or more loaded pallets. Again, a fork lift truck may be utilized to remove the loaded pallets from the conveyor 27.

Figure 3:
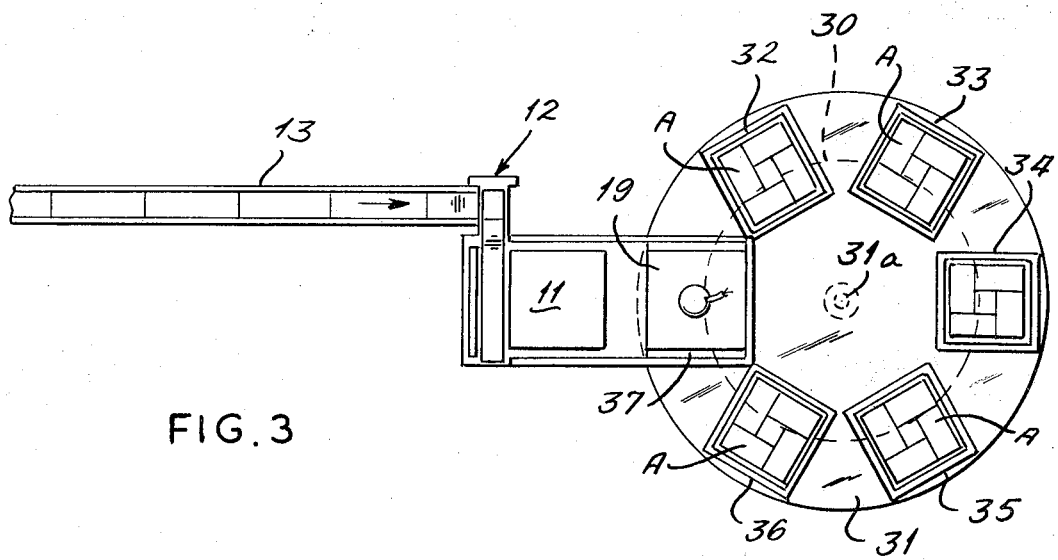
FIG. 3 is a plan view of a modified apparatus incorporating a carrousel carriage for the pallets.
Figure 4:
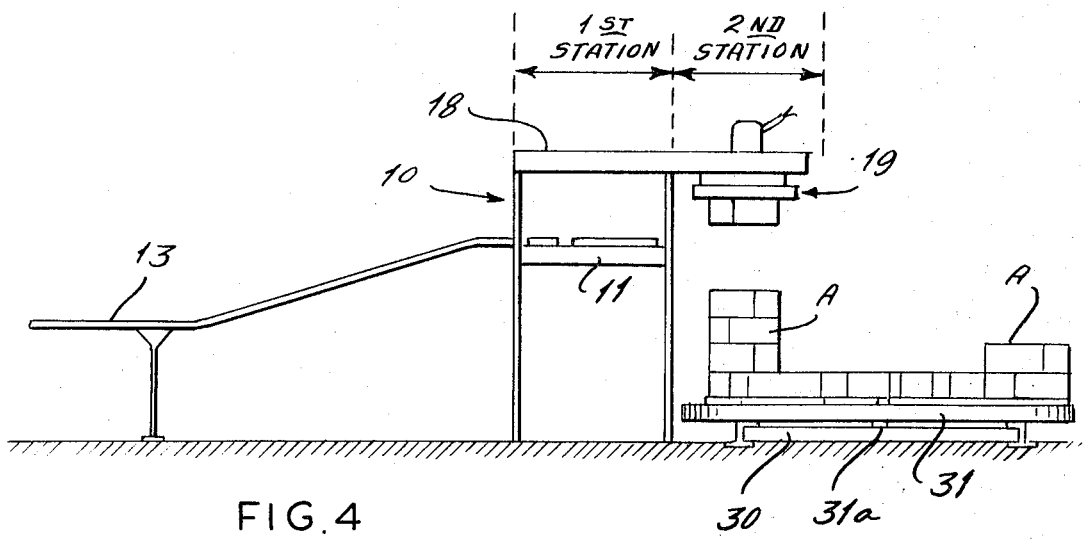
FIG. 4 is an elevational view of the modified apparatus of FIG. 3.

A modified form of the apparatus is seen in FIGS. 3 and 4. Wherever possible the same reference numerals will be used in FIGS. 3 and 4 as have heretofore been used in FIGS. 1 and 2. It is believed only necessary to point out in connection with FIGS. 3 and 4 that in place of the carriage 24 movable along the linear rails 25, the modified apparatus has a suitable floor-mounted bearing ring 30 which supports a motor driven, reversibly rotatable carrousel carriage 31 having on its upper surface a plurality of pallet receiving tables 32 through 37, inclusive. The carriage 31 is moved about a central vertical axis 31a on the bearing 30 so that each one of the receiving tables 32 through 37 inclusive can be properly indexed and aligned with the vertical travel of the suction head 19.

It is, of course, apparent from the foregoing description that the carriage 31 with its six different pallet receiving tables is well adapted to handle up to six different palletized loads of articles having different characteristics, or any lesser number of articles of different characteristics or articles having the same characteristics at all tables. The versatility in the handling of articles of the same or different characteristics is extended to the operation of the modified apparatus whereby palletized loads of articles may be created at the rotatable carriage 31 or may be brought to the carriage for dispersal to the conveyor 13 and into the tributary conveyors 14 through 17, or as otherwise arranged within the scope of this disclosure.

SUMMARY OF OPERATION

As may be understood from the disclosure in FIGS. 1 and 3, the present apparatus very simply and expeditiously handles discrete articles of a character for multi-layer palletization and consists of the means 10 which defines a first station for receiving and dispensing articles layer by layer, and a second station spaced from the first station, wherein the transfer of the discrete articles layer by layer takes place with respect to a pallet, or one of a plurality of pallets, which is supported in registration with the second station and in position to receive articles layer by layer or to discharge the articles layer by layer to the suction head means which transports the articles between the first station and the pallet registered with the second station. The apparatus is susceptible of an arrangement (as in FIG. 1) wherein a carriage 24 is movable in a linear path defined by rails 25 to move one of a plurality of pallets on a common carriage through a position of registration with the second station. Alternatively, a carriage having a non-linear path, such as the carrousel 31, can be incorporated with the apparatus 10.

The foregoing specification and drawings has set forth certain preferred embodiments of apparatus suitable for practicing the herein defined method of handling discrete articles of a character for multi-layer palletization. The method consists in the steps of locating a pallet in a defined location relative to palletizing apparatus, providing an article receiving location in the apparatus adjacent the pallet location wherein articles are selectively collected and dispensed, a layer at a time, gripping the articles a layer at a time in either location and transporting the layers to the other of the locations, and moving or indexing one of a plurality of pallets into the pallet location.

In referring to the suitability of the conveyor system 12 through 17, inclusive, it is understood that the corner assembly 12 (being shown only schematically) may include known devices for permitting the articles to go through the corner assembly toward the forming table 11 either without changing the alignment or by changing the alignment 90°, thereby permitting the layers collected on the forming table 11 to be so selected that interlocking layers of discrete articles is achieved. Also, the corner assembly 12 can be so arranged that articles dispersed from the table 11 to the conveyor system 13 through 17, inclusive may be brought to the same orientation for delivery on to the conveyor 13. In this sense, then, the corner assembly is intended to break down the article orientation and deliver the articles to the conveyor 13 all in a uniform alignment.

While a preferred embodiment has been set forth in the foregoing specification, it is to be understood that the reference to pallet is used in its broader sense to include any support means such as slip sheets which are a form of pallet used with certain articles for convenience and more effective handling.

What is claimed is:

1. Apparatus for selective operation at times for palletizing and depalletizing a plurality of articles of varying characteristics movable selectively between the apparatus and tributary conveyor means for each character of article, said apparatus comprising: a plurality of tributary conveyors, one for each character of article; a primary conveyor connected to each of said tributary conveyors and having one end through which the articles pass one at a time for palletizing and depalletizing operation; a table on which articles are selectively formed up into layers from said primary conveyor and dispersed onto said primary conveyor; a trackway supported above said table to provide a first station aligned with said table, said trackway having a portion extending to one side of said first station and providing a second station; a suction head operatively carried by said trackway to move between said first and second stations; and carriage means movable in a horizontal plane at a level below said elevated table, said carriage means providing a plurality of supports for pallets, with said pallet supports being aligned individually and selectively below said second station upon movement of said carriage, said operative connection of said suction head to said trackway permitting said suction head movement vertically in said second station and progressively layer by layer to match the article layering on a pallet in said second station.

2. The apparatus of claim 1 wherein said carriage movement is reversible to alternate pallets in registered position with said first station, and means driving said carriage in reverse directions.

3. The apparatus of claim 1 wherein said carriage has rotary axis about which it moves to bring any one of said carriage supported pallets into registry with the second station.

4. The apparatus of claim 1 wherein said conveyor means is connected into said table with an inclined portion, and said carriage is movable in a linear direction to pass beneath said table in locating a pallet in said second station.

5. Apparatus for selective operation at times to palletize and to depalletize a layer at a time a variety of groups of articles having different characteristics, said apparatus comprising: a horizontally directed elevated trackway providing first and second stations in spaced relation; an article supporting table spaced below said first station and of a size to support layers of articles; a movable carriage spaced below said second station; said carriage having a plurality of pallet supporting areas thereon; article carrying pallets on said pallet supporting areas in position to move with said carriage for selective alignment with said second station; suction head means operable on said trackway to move between said first and second stations, said suction head means also being movable vertically to and from said table and to and from a pallet on said carriage for transporting a layer at a time of articles therebetween where the articles in such layer being so transported between said table and a pallet at any one time are all of a common character; primary conveyor means operatively connected to said table to convey articles of any one group at a time and in quantities making a layer thereof selectively to and from said table; and a plurality of tributary conveyors each operatively connected to said primary conveyor to deliver to and receive from said primary conveyor articles all of a predetermined common character such that each tributary conveyor handles articles in groups having common characteristics different from groups of articles handled by other tributary conveyors.

6. The apparatus of claim 5 wherein said carriage is reversibly movable through said second station selectively to position any one pallet in alignment with the vertical movement of said suction head means and to alternate any of said plurality of pallets into alignment with said suction head such that the loading and unloading of said pallets may be mixed.

* * * * *